United States Patent
Kinthada Venkata et al.

(10) Patent No.: US 10,356,675 B2
(45) Date of Patent: Jul. 16, 2019

(54) HANDOVER CANDIDATE CELL IDENTIFICATION AND RADIO LINK FAILURE (RLF) MITIGATION IN COVERAGE AREAS

(71) Applicant: QUALCOMM Incorporated, San Diego, CA (US)

(72) Inventors: Madhusudan Kinthada Venkata, San Diego, CA (US); Nikhil Mali, Parsippany, NJ (US); Joshua Tennyson MacDonald, Superior, CO (US); Manjinder Singh Sandhu, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 15/497,760

(22) Filed: Apr. 26, 2017

(65) Prior Publication Data
US 2018/0049082 A1 Feb. 15, 2018

Related U.S. Application Data

(60) Provisional application No. 62/372,777, filed on Aug. 9, 2016.

(51) Int. Cl.
*H04W 36/04* (2009.01)
*H04W 24/10* (2009.01)
(Continued)

(52) U.S. Cl.
CPC .......... *H04W 36/04* (2013.01); *H04W 24/10* (2013.01); *H04W 36/0083* (2013.01);
(Continued)

(58) Field of Classification Search
CPC . H04W 48/16; H04W 36/30; H04W 36/0088; H04W 56/0005; H04W 56/001
See application file for complete search history.

(56) References Cited

U.S. PATENT DOCUMENTS

| 5,913,169 A | * | 6/1999 | Vaara | H04B 7/2606 455/443 |
|---|---|---|---|---|
| 8,599,828 B2 | | 12/2013 | Fine et al. | |

(Continued)

FOREIGN PATENT DOCUMENTS

EP   2787667 A1   10/2014

OTHER PUBLICATIONS

Design of discovery Bursts and Procedures, EGPP TSG RAN WG1 Meeting#76bis, Mar. 31-Apr. 4, 2014.*

(Continued)

*Primary Examiner* — Charles N Appiah
*Assistant Examiner* — Xiang Zhang
(74) *Attorney, Agent, or Firm* — QUALCOMM Incorporated Patterson & Sheridan, L.L.P.

(57) ABSTRACT

Aspects of the present disclosure relate to wireless communications and, more particularly, to identifying a cell as a handover candidate in coverage areas based on decoding a secondary synchronization signal and/or a primary broadcast channel of the handover candidate cell. An example method generally includes initiating a search for a secondary synchronization signal (SSS) for a first cell of one or more handover candidate cells, and reporting the first cell as a handover candidate in a measurement report if the SSS for the first cell is detected a threshold number of times.

22 Claims, 10 Drawing Sheets

(51) Int. Cl.
*H04W 36/00* (2009.01)
*H04W 36/30* (2009.01)
*H04W 48/16* (2009.01)
*H04W 56/00* (2009.01)

(52) U.S. Cl.
CPC ....... *H04W 36/0088* (2013.01); *H04W 36/30* (2013.01); *H04W 48/16* (2013.01); *H04W 56/001* (2013.01); *H04W 36/0094* (2013.01)

(56) References Cited

U.S. PATENT DOCUMENTS

| | | | |
|---|---|---|---|
| 9,078,146 B2 | 7/2015 | Gorokhov et al. | |
| 2004/0165561 A1* | 8/2004 | Chiou | H04W 16/18 370/338 |
| 2008/0167041 A1 | 7/2008 | Wang et al. | |
| 2009/0104909 A1* | 4/2009 | Vesely | H04W 36/08 455/436 |
| 2010/0329189 A1* | 12/2010 | Tsuboi | H04W 24/04 370/328 |
| 2011/0171926 A1* | 7/2011 | Faccin | H04W 48/18 455/404.1 |
| 2011/0183669 A1* | 7/2011 | Kazmi | H04J 11/0086 455/434 |
| 2012/0115431 A1* | 5/2012 | Kim | H04W 4/021 455/404.1 |
| 2013/0324131 A1* | 12/2013 | Shi | H04W 36/30 455/437 |
| 2014/0050191 A1* | 2/2014 | Kim | H04L 5/001 370/329 |
| 2014/0171073 A1* | 6/2014 | Kim | H04W 48/16 455/434 |
| 2015/0280849 A1 | 10/2015 | Tsai et al. | |
| 2015/0312776 A1 | 10/2015 | Cui et al. | |
| 2017/0280374 A1* | 9/2017 | Hayes | H04W 56/0015 |

OTHER PUBLICATIONS

Ericsson: "Performance Evaluations for Discovery Burst Design", 3GPP Draft; R1-141643, 3rd Generation Partnership Project (3GPP), Mobile Competence Centre; 650, Route Des Lucioles; F-06921 Sophia-Anti Polls Cedex; France, vol. RAN WG1, No. Shenzhen, China; Mar. 30, 2014, XP050787310, Retrieved from the Internet: URL:http://www.3gpp.org/ftp/Meetings_3GPP_SYNC/RAN1/Docs/ [retrieved on Mar. 30, 2014], 4 pages.

International Search Report and Written Opinion—PCT/US2017/041531—ISA/EPO—dated Dec. 21, 2017.

Nokia Siemens Networks et al., "On Signalling Support for FeICIC", 3GPP Draft; R1-120715, 3rd Generation Partnership Project (3GPP), Mobile Competence Centre; 650, Route Des Lucioles; F-06921 Sophia-Anti Polls Cedex; France, vol. RAN WG1, No. Dresden, Germany; Jan. 31, 2012, XP050563099, [retrieved on Jan. 31, 2012], 4 pages.

Qualcomm Europe: "Handover Signalling in E-UTRAN", 3GPP Draft; R2-073495, 3rd Generation Partnership Project (3GPP), Mobile Competence Centre; 650, Route Des Lucioles; F-06921 Sophia-Anti Polls Cedex; France, vol. RAN WG2. No. Athens, Greece; Aug. 15, 2007, XP050136197, [retrieved on Aug. 15, 2007], 3 pages.

Samsung: "Cell Search for NR: Design Consideration", 3GPP Draft; R1-163997, 3rd Generation Partnership Project (3GPP), Mobile Competence Centre; 650, Route Des Lucioles; F-06921 Sophia-Anti Polls Cedex; France, vol. RAN WG1, No. Nanjing, China; May 13, 2016, XP051090169, Retrieved from the Internet: URL:http://www.3gpp.org/ftp/tsg_ran/WG1_RL1/TSGR1_85/Docs/ [retrieved on May 13, 2016], 6 pages.

Samsung: "Evaluation Methodology for Small Cell Performance Analysis", 3GPP Draft; R2-132071, 3rd Generation Partnership Project (3GPP), Mobile Competence Centre; 650, Route Des Lucioles; F-06921 Sophia-Anti Polls Cedex; France, vol. RAN WG2, No. Fukuoka, Japan; May 11, 2013, XP050700154, Retrieved from the Internet: URL:http://www.3gpp.org/ftp/tsg_ran/WG2_RL2/TSGR2_82/Docs/ [retrieved on May 11, 2013], 4 pages.

Samsung: "Views on Cell Detection of Weak Pica in Co-Channel Hetnet", 3GPP Draft; R2-121496, 3rd Generation Partnership Project (3GPP), Mobile Competence Centre; 650, Route Des Lucioles; F-06921 Sophia-Anti Polls Cedex; France, vol. RAN WG2, No. Jeju, Korea; Mar. 19, 2012, XP050606006, [retrieved on Mar. 19, 2012], 3 pages.

* cited by examiner

HANDOVER CANDIDATE CELL IDENTIFICATION AND RADIO LINK FAILURE (RLF) MITIGATION IN COVERAGE AREAS

CROSS-REFERENCE TO RELATED APPLICATIONS

This application claims benefit of U.S. Provisional Patent Application Ser. No. 62/372,777, entitled "Handover Candidate Cell Identification and Radio Link Failure (RLF) Mitigation in Coverage Areas," filed Aug. 9, 2016, and assigned to the assignee hereof, the contents of which are hereby incorporated by reference in its entirety.

BACKGROUND

Field of the Disclosure

Aspects of the present disclosure generally relate to wireless communication and, more particularly, to determining a handover candidate cell in coverage areas based on decoding one or more symbols broadcast by the handover candidate cell.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations (e.g., Node B, evolved Node B (eNB), Access Point (AP), Base Station Transceiver (BST), Transmit/Receive Point (TRP)) to the terminals, and the reverse link (or uplink) refers to the communication link from the terminals to the base stations. This communication link may be established via a single-input single-output, multiple-input single-output or a multiple-input multiple-output (MIMO) system.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to determining a handover candidate cell by a UE. As described herein, handover candidate cells may be determined based, at least in part, on detecting secondary synchronization signals (SSS) for different cells in a network.

According to an aspect of the present disclosure, a method generally includes initiating a search for a secondary synchronization signal (SSS) for a first cell of one or more handover candidate cells, and reporting the first cell as a handover candidate in a measurement report if the SSS for the first cell is detected a threshold number of times.

Aspects of the present disclosure include an apparatus for wireless communications. The apparatus generally includes a processor configured to initiate a search for a secondary synchronization signal (SSS) for a first cell of one or more handover candidate cells, and report the first cell as a handover candidate in a measurement report if the SSS for the first cell is detected a threshold number of times.

Aspects of the present disclosure provide an apparatus for wireless communications. The apparatus generally includes means for initiating a search for a secondary synchronization signal (SSS) for a first cell of one or more handover candidate cells, and means for reporting the first cell as a handover candidate in a measurement report if the SSS for the first cell is detected a threshold number of times.

Aspects of the present disclosure provide a computer-readable medium for wireless communications. The computer-readable medium includes instructions stored thereon for initiating a search for a secondary synchronization signal (SSS) for a first cell of one or more handover candidate cells, and reporting the first cell as a handover candidate in a measurement report if the SSS for the first cell is detected a threshold number of times.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
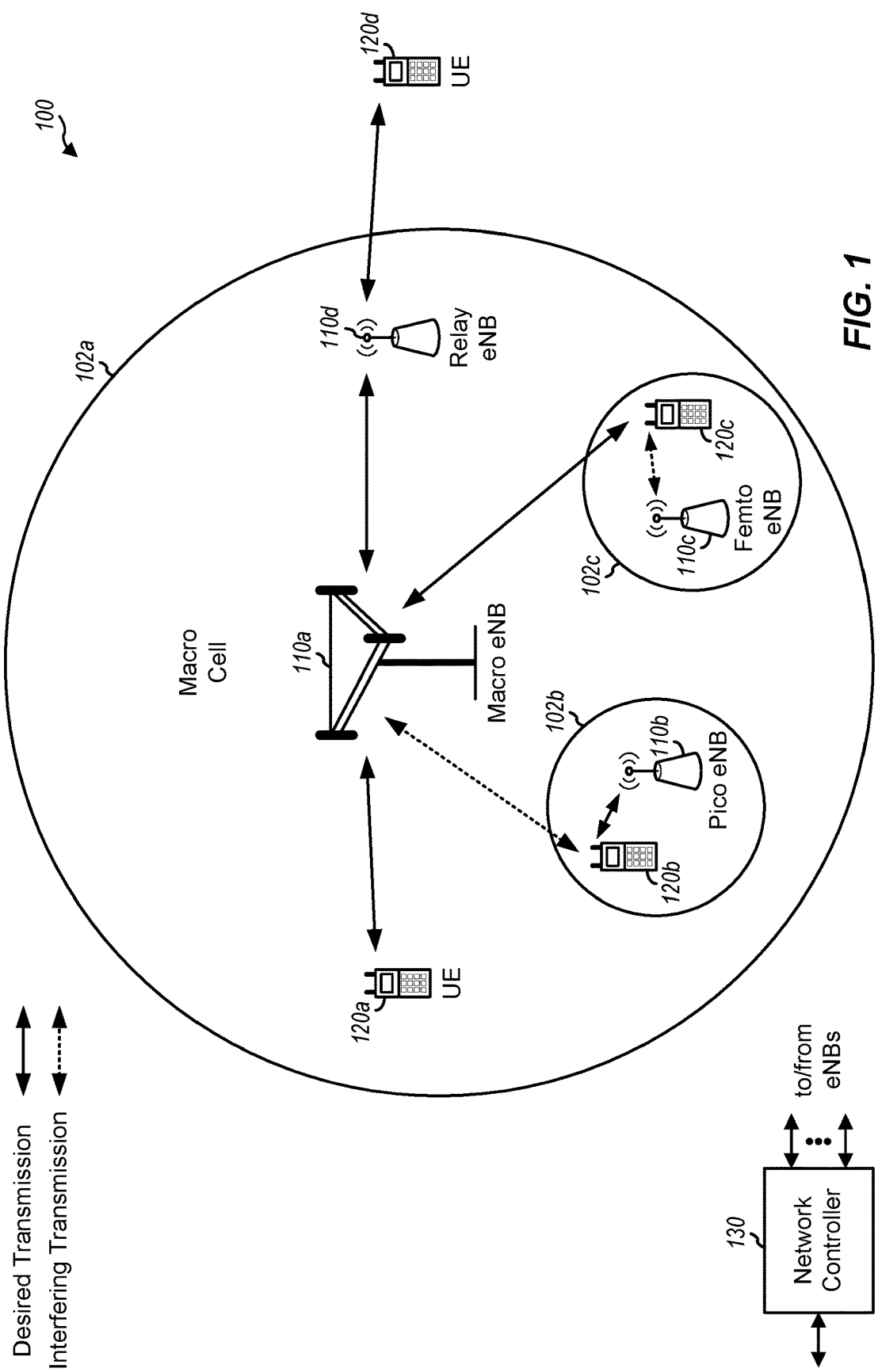
FIG. 1 illustrates an example of a wireless communication network, in accordance with certain aspects of the present disclosure.

Aspects of the present disclosure relate to identification of a handover candidate cell in coverage areas (e.g., weak coverage areas). In aspects, a UE can attempt to decode the primary broadcast channel (PBCH) after unsuccessfully attempting to detect a secondary synchronization signal (SSS) broadcast by the handover candidate cell. By attempting to decode the PBCH, a UE can identify a cell as a handover candidate cell in situations where the UE determines that the cell meets a signal quality threshold but fails to detect the SSS broadcast by the handover cell. Numerous other aspects are provided.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Some examples of UEs may include cellular phones, smart phones, personal digital assistants (PDAs), wireless modems, handheld devices, tablets, laptop computers, netbooks, smartbooks, ultrabooks, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link.

It is noted that while aspects may be described herein using terminology commonly associated with 3G and/or 4G wireless technologies, aspects of the present disclosure can be applied in other generation-based communication systems, such as 5G and later.

Example Wireless Communications Network

FIG. 1 illustrates an example wireless communication network 100, in which aspects of the present disclosure may be practiced. In aspects, techniques are presented for identifying a handover candidate cell based on detecting at least one secondary synchronization signal (SSS) or, if SSS detection fails, decoding a primary broadcast channel (PBCH). By reporting an identified handover candidate cell based on decoding one or more SSSs or a primary broadcast channel (PBCH) if SSS detection fails, a rate at which radio link failure (RLF) is experienced during handover may be decreased. In aspects, techniques are presented for deletion of a target cell as a handover candidate cell based on failing to decode one or more SSSs and PBCH for a threshold number of times.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
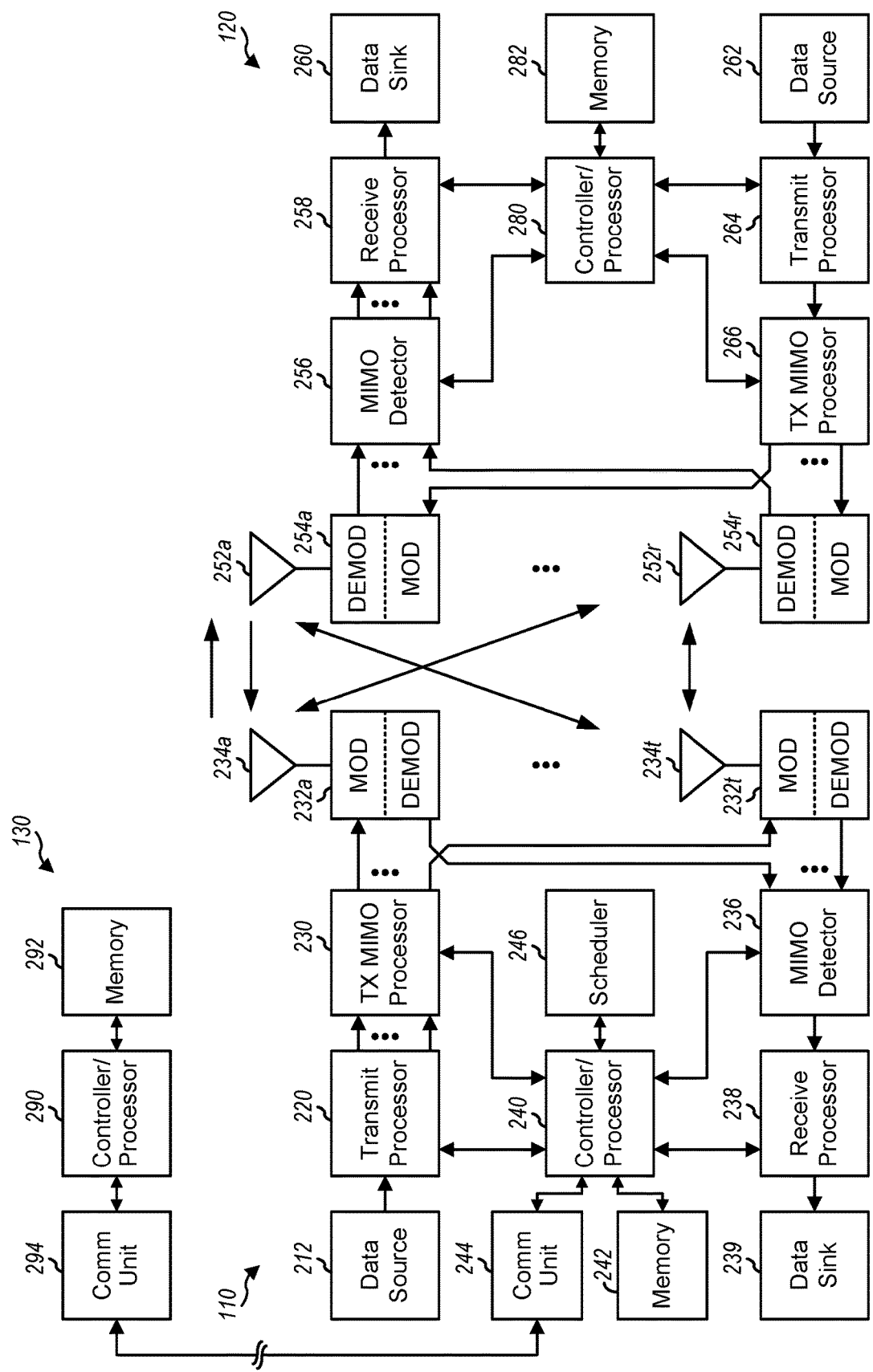
FIG. 2 shows a block diagram conceptually illustrating an example of a base station (BS) in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, Rnn, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 280 may direct the operation UE 120 to perform techniques presented herein for identifying a cell as a handover candidate based on a secondary synchronization signal (SSS) and/or primary broadcast channel (PBCH) search, and for deletion of a target cell as a handover candidate cell based on failing to decode one or more SSSS and PBCH for a threshold number of times.

One or more modules illustrated in FIG. 2 may be configured to perform the operations described herein and illustrated in FIGS. 6-10. At the eNB 110, the controller/processor 240, scheduler 246, mod/demod 232, and/or antenna 234 may be configured to perform the recited and described operations. At the UE 120, the controller/processor 280, mod/demod 254, and antenna 252 may be configured to perform the recited and described operations.

Memories 242 and 282 may store data and program codes for base station 110 and UE 120, respectively. A scheduler 246 may schedule UEs for data transmission on the downlink and/or uplink.

Figure 3:
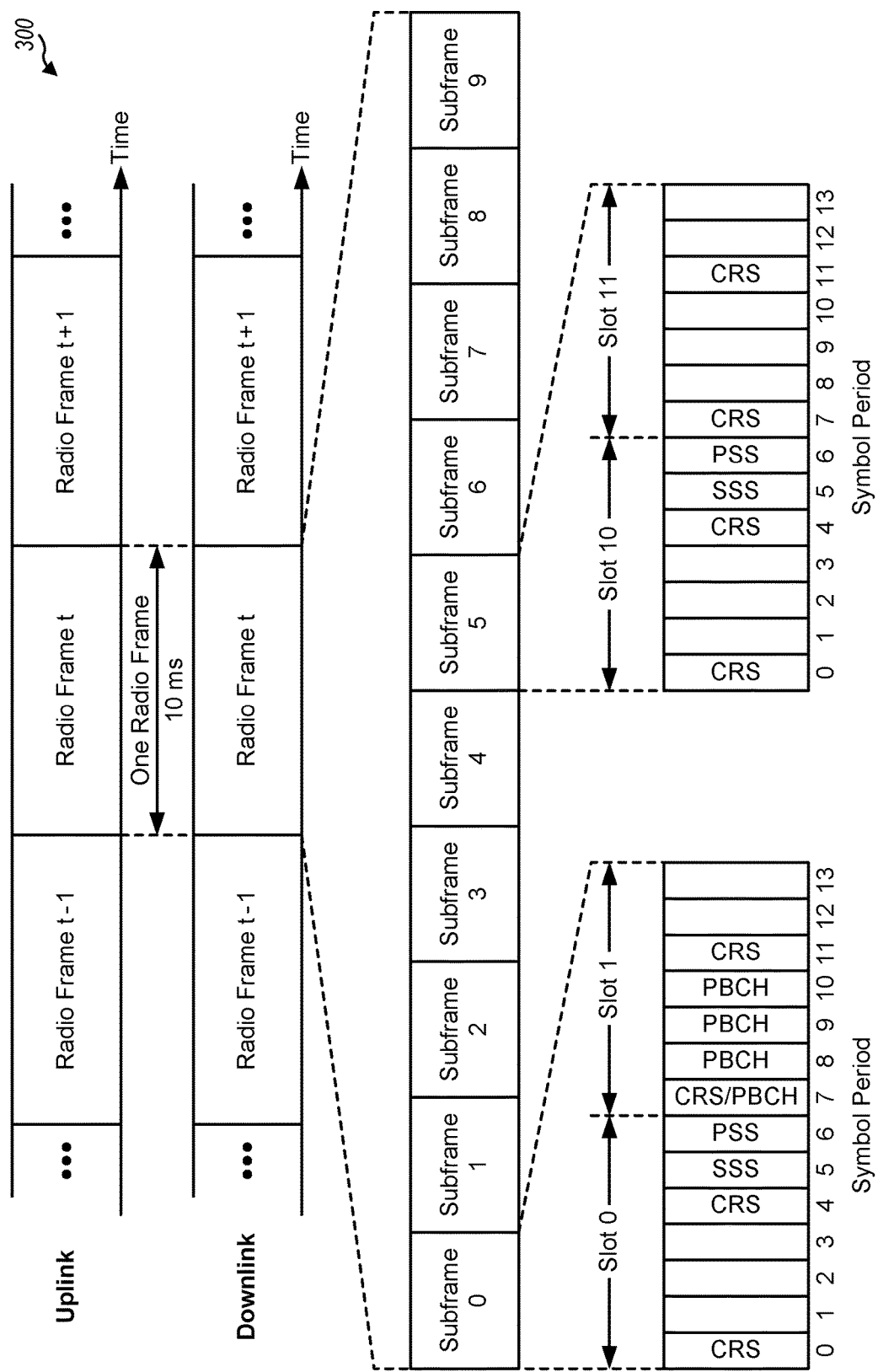
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe. In aspects, a serving cell and one or more neighbor cells are synchronous, such that SSS for the serving and the one or more neighbor cells may interfere.

Figure 4:
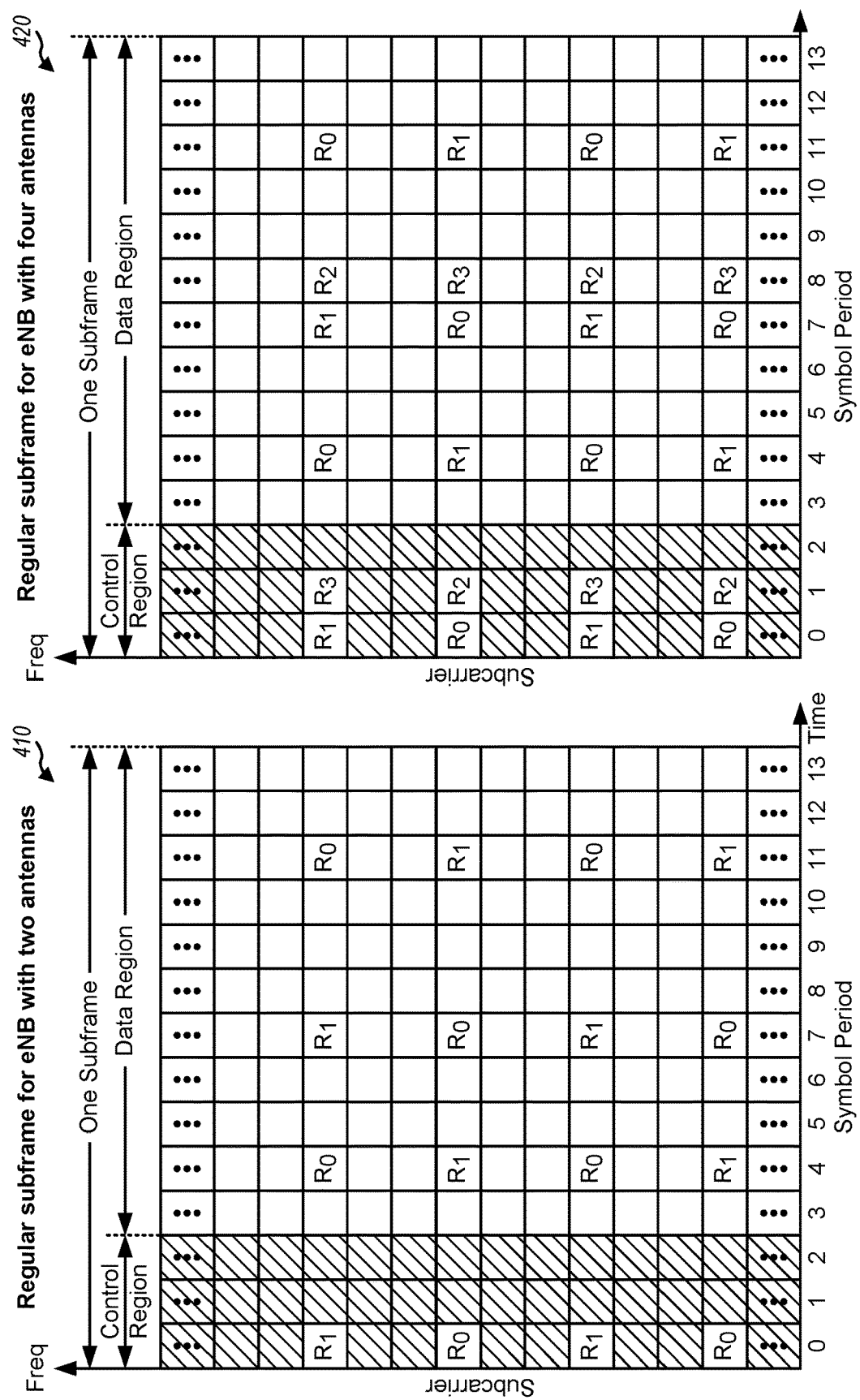
FIG. 4 is a block diagram conceptually illustrating two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Figure 5:
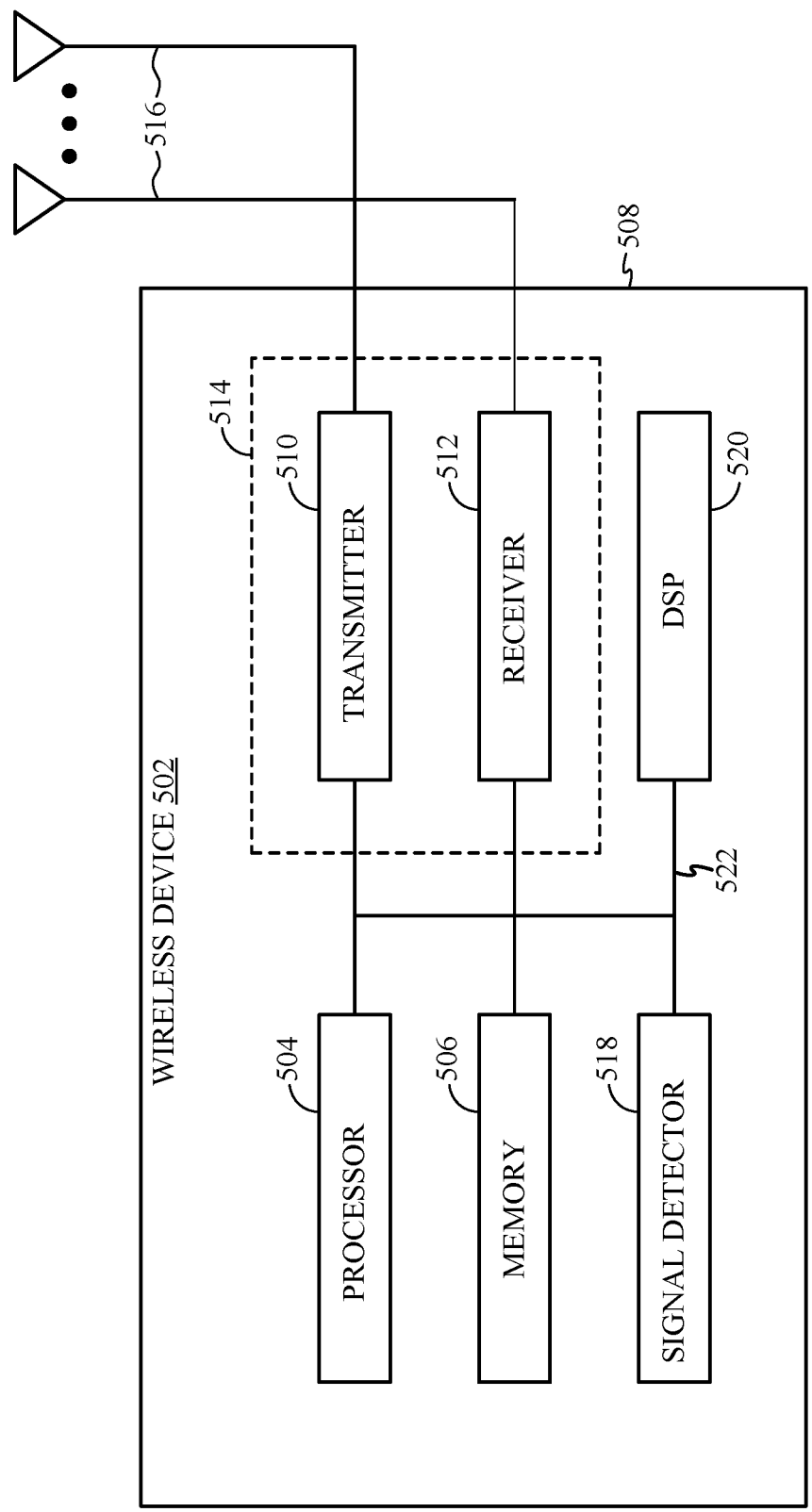
FIG. 5 illustrates various components that may be utilized in a wireless device, in accordance with certain aspects of the present disclosure.

FIG. 5 illustrates various components that may be utilized in a wireless device 502 that may be employed within the wireless communication network 100 illustrated in FIG. 1. The wireless device 502 is an example of a device that may be configured to implement the various methods described herein. The wireless device 502 may be a base station 110 or any of the wireless nodes (e.g., UEs 120). For example, the wireless device 502 may be configured to perform operations and techniques illustrated in FIGS. 6-9 as well as other operations described herein.

The wireless device 502 may include a processor 504 that controls operation of the wireless device 502. The processor 504 may also be referred to as a central processing unit (CPU). Memory 506, which may include both read-only memory (ROM) and random access memory (RAM), provides instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable to implement the methods described herein. Some non-limiting examples of the processor 504 may include Snapdragon processor, application specific integrated circuits (ASICs), programmable logic, etc.

The wireless device 502 may also include a housing 508 that may include a transmitter 510 and a receiver 512 to allow transmission and reception of data between the wireless device 502 and a remote location. The transmitter 510 and receiver 512 may be combined into a transceiver 514. A single transmit antenna or a plurality of transmit antennas 516 may be attached to the housing 508 and electrically coupled to the transceiver 514. The wireless device 502 may also include (not shown) multiple transmitters, multiple receivers, and multiple transceivers. The wireless device 502 can also include wireless battery charging equipment.

The wireless device 502 may also include a signal detector 518 that may be used in an effort to detect and quantify the level of signals received by the transceiver 514. The signal detector 518 may detect such signals as total energy, energy per subcarrier per symbol, power spectral density and other signals. The wireless device 302 may also include a digital signal processor (DSP) 520 for use in processing signals.

The various components of the wireless device 502 may be coupled together by a bus system 522, which may include a power bus, a control signal bus, and a status signal bus in addition to a data bus. The processor 504 may be configured to access instructions stored in the memory 506 to perform beam refinement with aspects of the present disclosure discussed below.

Massive MIMO

Multiple-antenna (multiple-input multiple-output (MIMO)) technology is becoming common for wireless communications and has been incorporated into wireless broadband standards such as long term evolution (LTE) and Wi-Fi, for example. In MIMO, the more antennas the transmitter/receiver is equipped with, the more the possible signal paths (e.g., spatial streams) and the better the performance in terms of data rate and link reliability. Increased number of antennas can also involve increased complexity of the hardware (e.g., number of radio frequency (RF) amplifier frontends) and increased complexity and energy consumption of the signal processing at both ends.

Massive MIMO may involve the use of a very large number of service antennas (e.g., hundreds or thousands) that can be operated coherently and adaptively. The additional antennas may help focus the transmission and reception of signal energy into smaller regions of space. This can lead to huge improvements in throughput and energy efficiency, in particularly when combined with simultaneous scheduling of a large number of user terminals (e.g., tens or hundreds). Massive MIMO can be applied in time division duplex (TDD) operation and also in frequency division duplex (FDD) operation.

Example Transfer (e.g., Handover) Candidate Cell Identification in Coverage Areas Voice over packet switched networks, such as voice over Long Term Evolution (VoLTE) is being deployed. In some cases, VoLTE may experience more dropped calls than legacy voice over circuit switched networks (e.g., voice calls on 2G or 3G networks). Some of these failures may be due to radio link failure (RLF) in LTE, which may be caused, in some cases, by intra-frequency handover failures, for example, in weak coverage areas.

In some cases, a UE can perform neighbor measurements based on cell-specific reference signals (CRS) broadcast by each neighbor cell to identify neighbor cells as handover candidates. Searches may be performed based on the secondary synchronization signal (SSS). The UE can send a measurement report to a neighbor cell to request a transfer, such as a handover, based on cells found during neighbor measurement. In some cases, a cell identified in the measurement report as the strongest neighbor (e.g., based on signal quality or power measured from the CRS) may not be detected during an SSS search.

In such a case, where the serving cell and/or neighbor cells is weak, the UE can initiate a measurement report upon a neighbor measurement event and time to trigger (TTT) criteria (or other expiration time criteria), being satisfied. The measurement report requests the network to grant a handover to a neighbor cell identified in the measurement report. The network may subsequently grant a handover to the neighbor cell identified in the measurement report.

The UE initiates a search for SSS from the identified neighbor cell, which may be the target cell for handover. If the serving and neighbor cells are synchronous, SSS for the serving and neighbor cells may interfere, which may result in poor SSS signal-to-noise ratio (SNR) for the neighbor cell. However, the CRS may be free from interference, for example, if the serving and neighbor cells use a non-colliding CRS and/or the neighbor cell is less loaded. Thus, the UE may not report the neighbor cell in an SSS search if the SSS SNR is below a threshold; however, the UE may continue to report the cell in neighbor measurement. Because the UE is unable to detect the target cell during SSS search for handover acquisition, a handover failure may occur, which may result in an RLF (e.g., and correspondingly, a call drop).

To reduce the likelihood of experiencing handover failure in situations where a UE detects a neighbor cell in neighbor measurement (e.g., based on CRS) but does not detect the neighbor cell in neighbor search (e.g., based on SSS), a UE may, according to aspects of the present disclosure, use neighbor measurement results and SSS search results to identify a neighbor cell to report in a measurement report as a transfer (e.g., handover) candidate. By utilizing neighbor measurement results and SSS search results, a UE can identify neighbor cells with sufficient signal strength, which may allow a UE to avoid handover attempts to cells which the UE may not be able to successfully connect with (e.g., cells for which the UE can detect a primary synchronization symbol (PSS) but for which the UE may not be able to detect the SSS and/or other signals).

Figure 6:
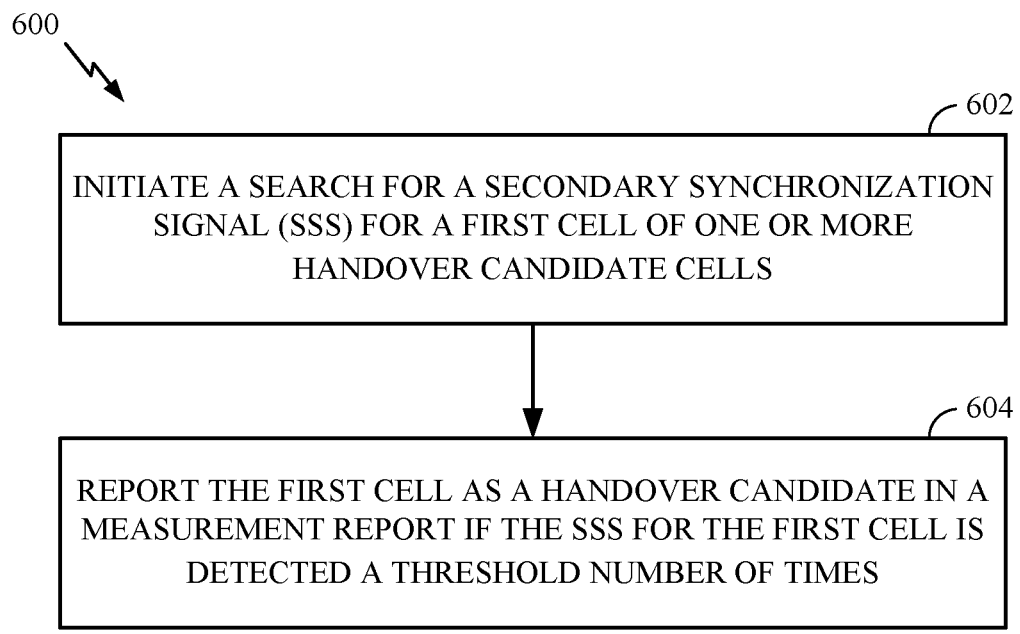
FIG. 6 illustrates example operations performed, by a UE, in accordance with certain aspects of the present disclosure.

FIG. 6 illustrates example operations that may be performed by a UE to identify a neighbor cell as a handover candidate based on neighbor measurement and SSS detection, according to an aspect of the present disclosure. As illustrated, operations 600 start at 610, where the UE initiates a search for a secondary synchronization symbol (SSS) for a first cell in a group of one or more handover candidate cells. At 620, the UE reports the first cell as a handover candidate in a measurement report if the SSS for the first cell is detected a threshold number of times.

In some aspects, neighbor measurement results and SSS search results may be used to identify a neighbor cell to report in a measurement report. The neighbor cells from which the UE can select a cell as a candidate cell may include one or more cells having a detected signal quality that is above a signal quality threshold level. The UE can initiate an SSS search for the strongest cell (e.g., the cell with the highest detected signal quality) reported during neighbor measurement (e.g., which, as discussed above, may be based on measuring signal strength from a CRS). If the strongest neighbor cell identified in the neighbor measurement meets a measurement object threshold while a handover time to trigger is running, the UE attempts to detect SSS for the identified cell for a threshold number of SSS searches. If the UE is able to detect SSS for the identified cell for the threshold number of searches, the UE can report the cell in a measurement report as a handover candidate. Detection of the SSS for the threshold number of searches may indicate that the cell is accessible and that a handover attempt to the cell is likely to succeed (e.g., is unlikely to result in a handover failure).

If the strongest neighbor cell is not detected for a threshold number of SSS searches while a handover time to trigger is running, the UE may schedule PBCH decoding for the neighbor cell. In some cases, scheduling PBCH decoding for the neighbor cell may be further based on determining that a signal quality metric (e.g., reference signal received power and/or reference signal received quality) is less than a signal quality threshold. As described in further detail below, the success or failure of a PBCH decoding for the neighbor cell may determine whether the neighbor cell is retained in or removed from the list of handover candidate cells.

In some cases, each neighbor cell may be associated with a transfer (e.g., handover) time to trigger period. The time to trigger period may be an expiration time that indicates a time period after transmission of a measurement report during which the cell cannot be removed as a handover candidate cell.

In some cases, an initial PBCH decoding for the neighbor cell (e.g., in an attempt to successfully decode a master information block (MIB) associated with the neighbor cell) may be scheduled if an amount of time remaining on the transfer (e.g., handover) time to trigger period for the neighbor cell is greater than an amount of time needed to decode PBCH. If a PBCH decode cyclic redundancy check (CRC) fails while a sufficient amount of time remains on the handover time to trigger period, the UE may schedule additional PBCH decodes.

When an insufficient amount of time remains on the handover time to trigger period to schedule a PBCH decoding and the UE has not successfully decoded the PBCH, the UE can determine that the identified neighbor cell is not a handover candidate. The UE may remove the cell from the list of handover candidate cells and need not transmit a measurement report to the serving cell identifying the neighbor cell as a handover candidate.

If the UE is able to successfully decode the PBCH (e.g., the CRC of the decoded MIB in the PBCH passes), the UE may determine that the cell is a legitimate cell (e.g., that the cell is not a spoofed cell or a cell that does not actually exist).

The UE may generate a measurement report identifying the neighbor cell as a handover candidate. Upon receiving a handover grant from the serving cell, the UE need not decode one or more portions of PBCH again after handover to the identified neighbor cell, as the UE may already have decoded the master information block (MIB) including information needed to synchronize with the target eNB. In such a case where the UE has already decoded the MIB, after cell transfer (e.g., handover) is completed, the UE may proceed with decoding one or more system information blocks (SIBs) without performing additional decoding of the PBCH. By omitting a subsequent MIB decoding, the UE may reduce an amount of time needed to successfully complete handing over to the neighbor cell.

Figure 7:
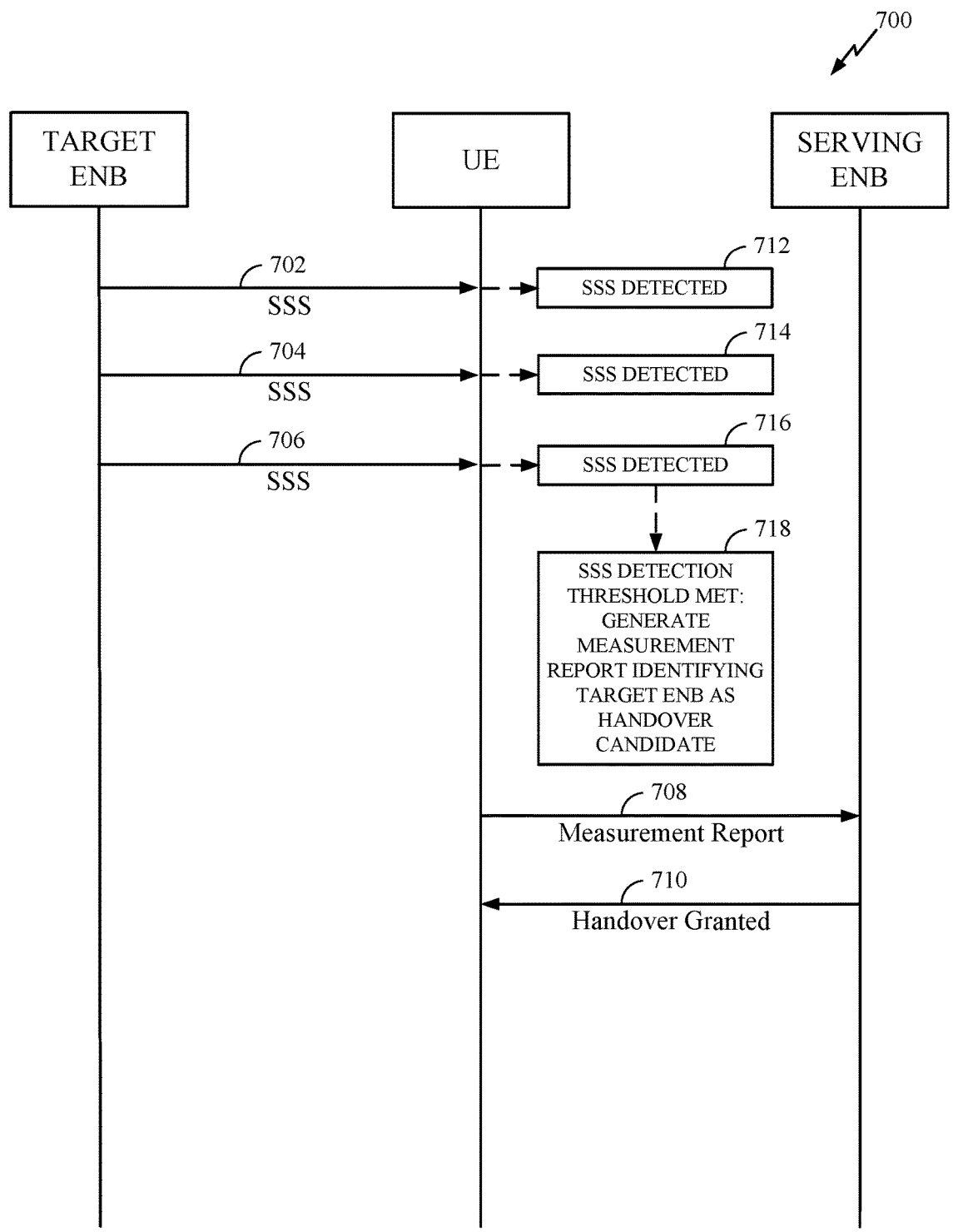
FIG. 7 is a call flow diagram illustrating an example message exchange between an eNodeB (eNB) and a UE for reporting an identified handover candidate cell based on successful detection of at least one secondary synchronization signal (SSS), in accordance with certain aspects of the present disclosure.

FIG. 7 illustrates an example message flow 700 for requesting handover to a target eNodeB (eNB) based on successfully detecting an SSS for the target eNB, according to an aspect of the present disclosure.

As illustrated, after a UE performs a neighbor measurement to identify a target eNB, the UE attempts to detect a first SSS 702 transmitted by the target eNB. At 712, the UE successfully detects the SSS and increments a counter of the number of times the UE has successfully detected the SSS from the target eNB. The UE receives a second SSS 704 and a third SSS 706, and at 714 and 716, successfully detects the respective SSSs and increments the counter.

At 718, the UE determines that the SSS detection threshold is met, which may indicate that the identified target eNB may be identified as a handover candidate in a measurement report. The UE generates a measurement report 708 identifying the target eNB as a handover candidate and transmits the measurement report 708 to the serving eNB. In response the serving eNB transmits a message 710 indicating that handover has been granted to the target eNB. The UE may synchronize with the target eNB and begin communicating with the target eNB.

Figure 8:
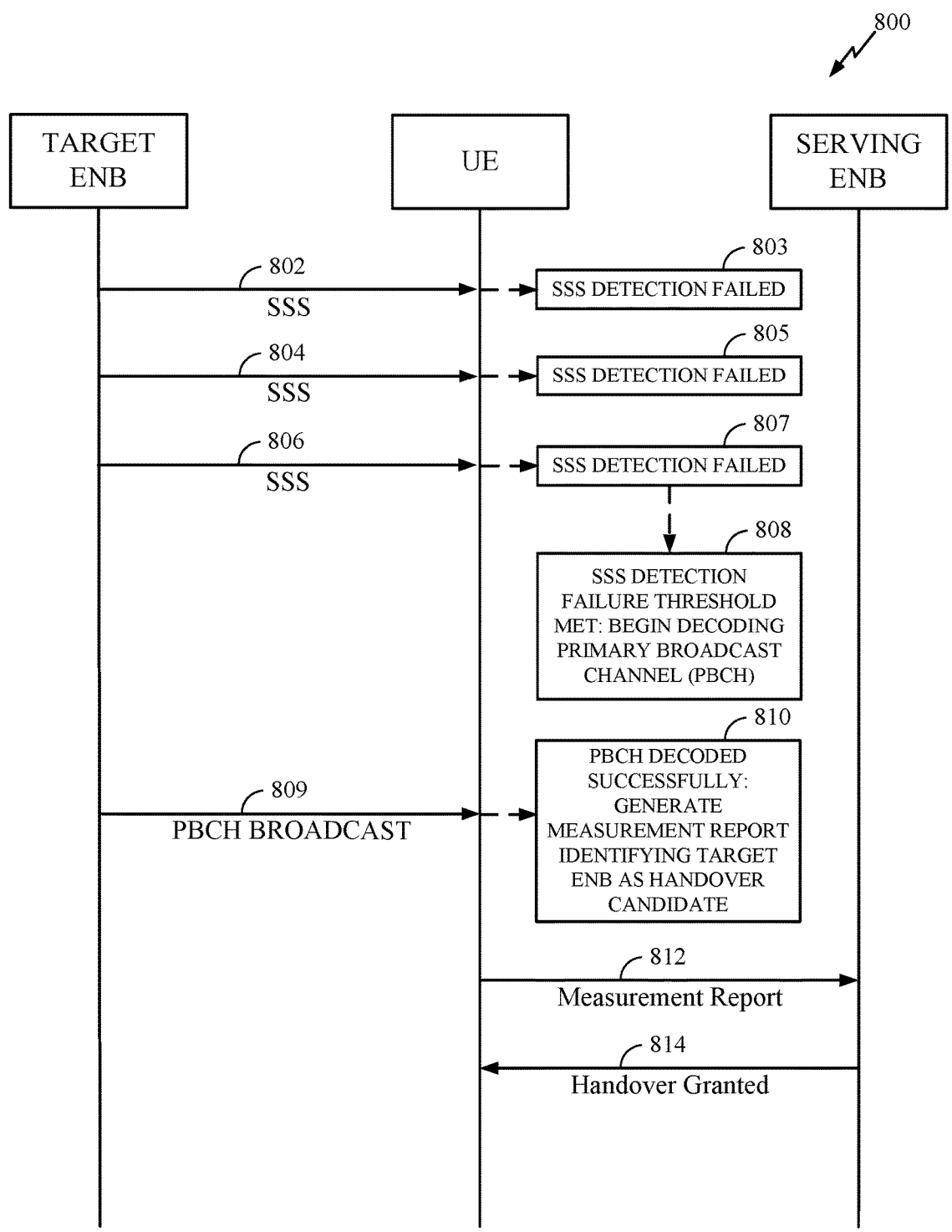
FIG. 8 is a call flow diagram illustrating an example message exchange between an eNodeB (eNB) and a UE for reporting an identified handover candidate cell based on successful decoding of a primary broadcast channel (PBCH), in accordance with certain aspects of the present disclosure.

FIG. 8 illustrates an example message flow 800 for requesting handover to a target eNodeB (eNB) based on successfully decoding the PBCH for an associated target cell after failing to detect SSS for the target eNB, according to an aspect of the present disclosure.

As illustrated, after a UE performs a neighbor measurement to identify a target eNB, the UE attempts to detect a first SSS 802 transmitted by the target eNB. At 803, the UE determines that SSS detection failed and increments a counter of the number of the times the UE was unable to successfully detect the SSS from the target eNB. The UE may similarly attempt to detect a second SSS 804 transmitted by the target eNB and a third SSS 806 transmitted by the target eNB. At 805, the UE determines that the second SSS 804 was unsuccessfully detected, and at 807, the UE determines that the third SSS 806 was unsuccessfully detected.

At 808, the UE determines that the SSS detection failure was met and proceeds with attempts to decode the primary broadcast channel (PBCH) (e.g., of a target cell associated with the target eNB) to determine if the target eNB can be reported to the serving eNB as a handover candidate. At 809, the UE receives a PBCH broadcast from the target cell, and at 810, the UE successfully decodes the PBCH. Because the UE successfully decoded the PBCH, the UE can generate a measurement report 812 identifying the target eNB as a handover candidate and transmits the measurement report 812 to the serving eNB. In response, the UE receives a message 814 from the serving eNB indicating that the handover to the target eNB was granted. As discussed above, because the UE has already decoded the PBCH of the target cell associated with the target eNB (e.g., which includes the master information block (MIB)), the UE need not decode the PBCH again. The UE may proceed with decoding the system information blocks broadcast by the target eNB to synchronize with the target eNB.

Figure 9:
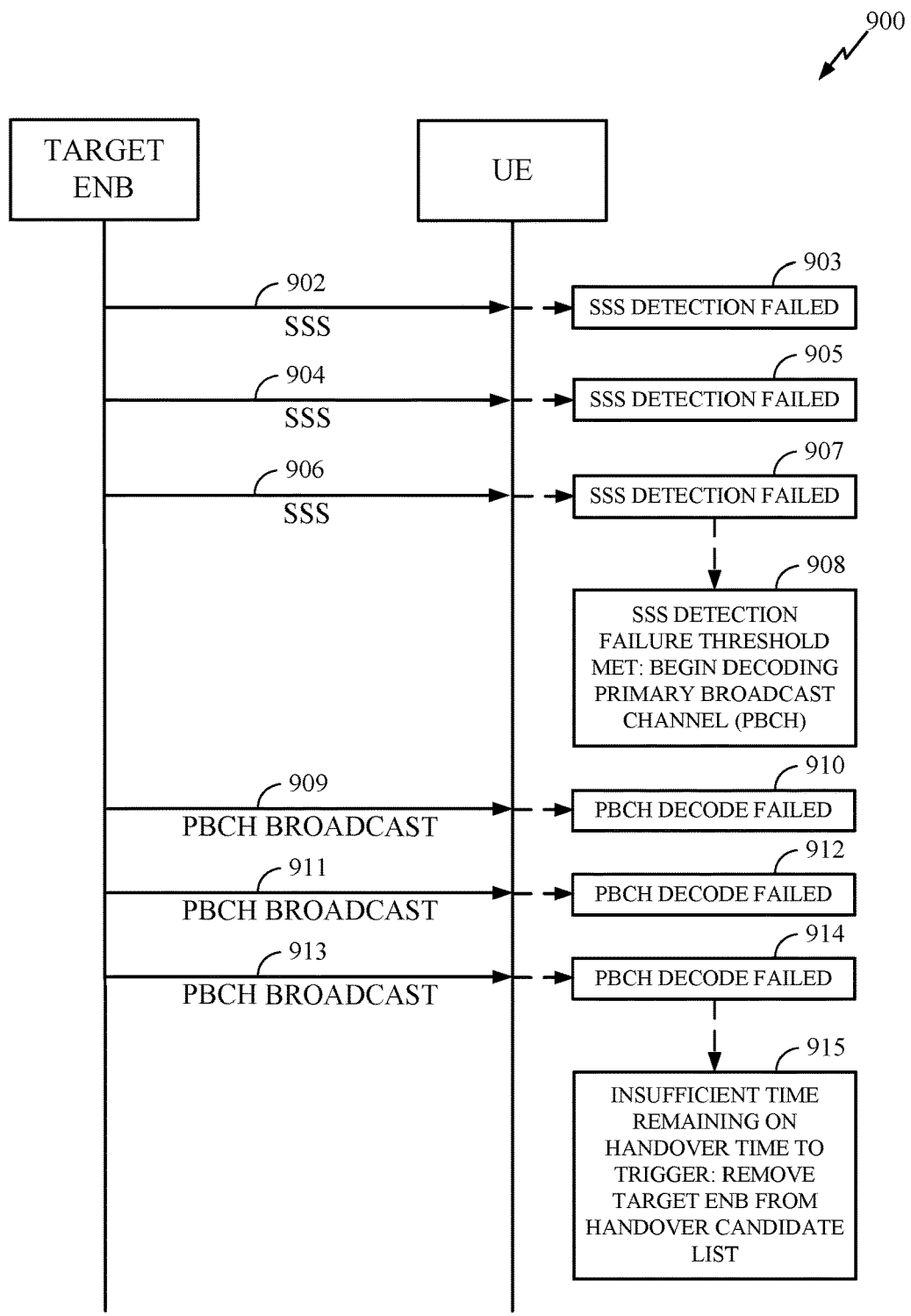
FIG. 9 is a call flow diagram illustrating an example deletion of a target cell as a handover candidate cell based on failing to decode one or more SSSs and PBCH for a threshold number of times, in accordance with certain aspects of the present disclosure.

FIG. 9 illustrates an example message flow 900 for removing a target eNB from one or more transfer (e.g., handover) candidate cells (e.g., a list of handover candidate cells), according to an aspect of the present disclosure.

As illustrated, after a UE performs a neighbor measurement to identify a target eNB, the UE attempts to detect a first SSS 902 transmitted by the target eNB. At 903, the UE determines that SSS detection failed and increments a counter of the number of the times the UE was unable to successfully detect the SSS from the target eNB. The UE may similarly attempt to detect a second SSS 904 transmitted by the target eNB and a third SSS 906 transmitted by the target eNB. At 905, the UE determines that the second SSS 904 was unsuccessfully detected, and at 907, the UE determines that the third SSS 906 was unsuccessfully detected.

At 908, the UE determines that the SSS detection failure threshold was met and proceeds with attempts to decode the primary broadcast channel (PBCH) (e.g., of a target cell associated with the target eNB) to determine if the target eNB can be reported to the serving eNB as a handover candidate.

The UE attempts to decode PBCH broadcast 909, and at 910, determines that the PBCH decode failed (e.g., that a CRC check failed on the data transmitted on the PBCH). When a PBCH broadcast The UE attempts to further decode PBCH broadcasts 911 and 913. At 912, the UE determines that decoding PBCH broadcast 911 failed, and at 914, the UE determines that decoding PBCH broadcast 913 failed.

At 915, the UE determines that insufficient time is remaining on the handover time to trigger to schedule an additional PBCH decode. Because the UE was unable to decode the PBCH of the target eNB (e.g., of a target cell associated with the target eNB), the UE can determine that the eNB may not be reported to the serving cell as a handover candidate. The UE may remove the target eNB from the handover candidate list. In some cases, the UE may examine other neighbor cells (e.g., the cells identified from neighbor measurements with a signal quality exceeding a threshold signal quality) to identify a neighbor cell as a handover candidate.

In some cases, if a UE has already transmitted a measurement report identifying a cell as a handover candidate and the UE does not detect the identified cell in an SSS search, the UE need not remove the identified cell from the list of handover candidate cells immediately (e.g., to avoid re-searching for the neighbor cell). For example, the UE may use a signal quality threshold (e.g., RSRP or RSRQ) to determine if a cell can be removed from the list of handover candidate cells and to identify cells that may be handover candidate cells. The signal quality metric may be an instantaneous signal quality measurement or a signal quality measurement performed over a period of time. In such a case, if the UE is unable to detect SSS for an identified target cell for a threshold number of SSS searches and the measured signal quality for the identified target cell (e.g., based on CRS) is less than a threshold signal quality, the UE can remove the identified cell from the list of handover candidate cells.

Figure 10:
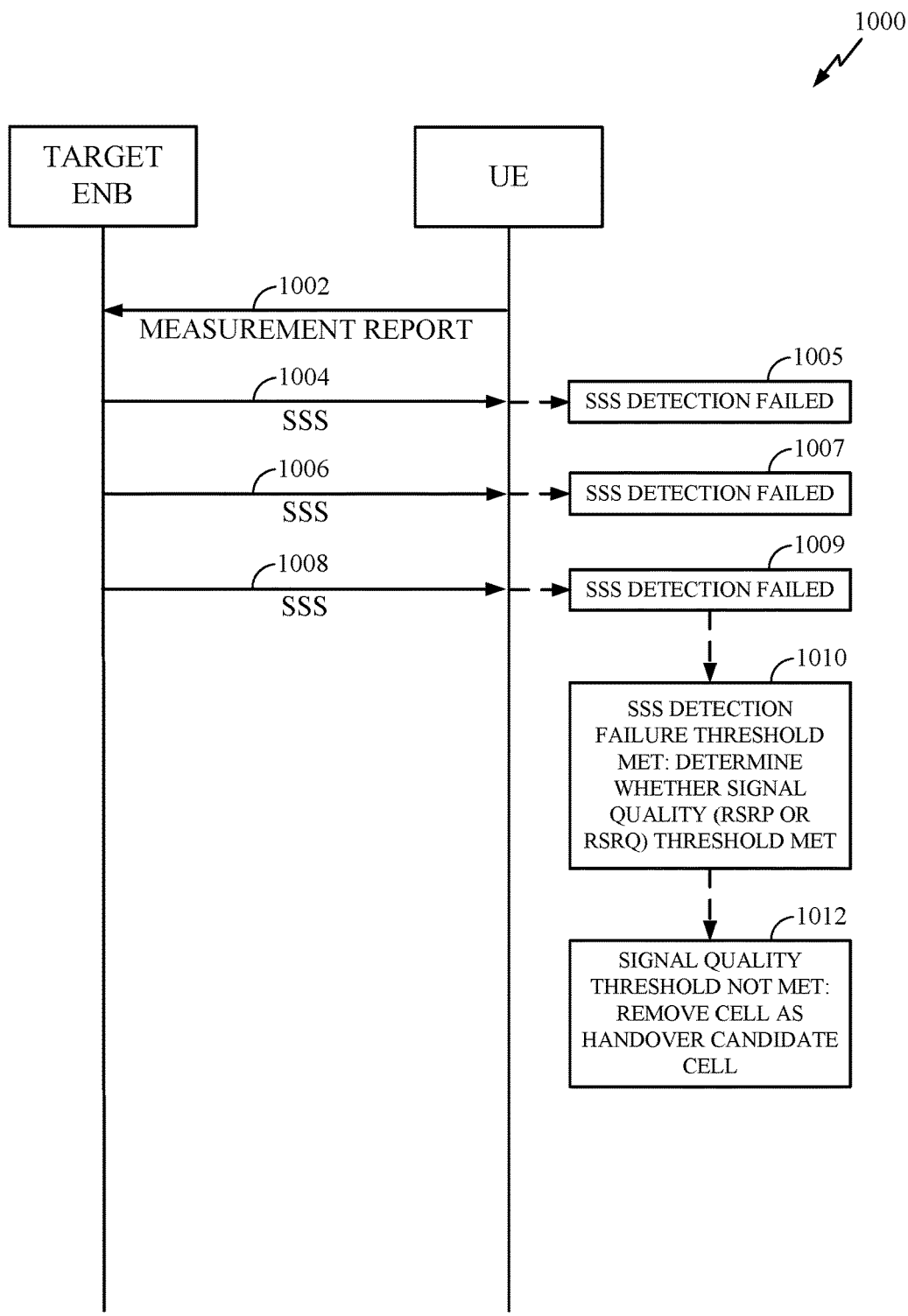
FIG. 10 is a call flow diagram illustrating an example deletion of a target cell as a handover candidate cell after transmission of a measurement report identifying the target cell as a handover candidate cell, in accordance with certain aspects of the present disclosure.

FIG. 10 illustrates an example message flow 1000 for removing a target cell as a handover candidate cell after transmission of a measurement report identifying the target cell as a handover candidate cell, according to an aspect of the present disclosure.

As illustrated, a UE can transmit measurement report 1002 to a target eNB. As discussed above, the measurement report can identify at least a first cell, of one or more handover candidate cells, as a handover candidate.

After transmission of measurement report 1002, the UE can attempt to decode the SSS for the target cell. As illustrated, the UE attempts to detect a first SSS 1004 transmitted by the target eNB. At 1005, the UE determines that SSS detection failed and increments a counter of the number of the times the UE was unable to successfully detect the SSS from the target eNB. The UE may similarly attempt to detect a second SSS 1006 transmitted by the target eNB and a third SSS 1008 transmitted by the target eNB. At 1007, the UE determines that the second SSS 1006 was unsuccessfully detected, and at 1009, the UE determines that the third SSS 1008 was unsuccessfully detected.

At 1010, the UE determines that the SSS detection failure threshold was met and determines whether a measured signal quality metric satisfies a signal quality threshold. The signal quality threshold may, in some cases, define a minimum reference signal received quality (RSRQ) or reference signal received power (RSRP) value for the target cell. At 1012, the UE determines that the measured signal quality metric does not meet the signal quality threshold. In response to the determination, the UE can remove the target cell as a handover candidate and choose another cell to examine for suitability as a handover candidate.

In some cases, the UE may use a time to live (TTL) criteria for determining when cells can be removed from a list of handover candidate cells. For example, if the UE has transmitted a measurement report within a TTL period from failing to detect SSS for the identified target cell for a threshold number of SSS searches, the UE may not remove the identified target cell from the list of handover candidate cells.

By selecting a neighbor cell as a handover candidate based on neighbor measurements and SSS search results, the UE may increase a likelihood that handover from a serving cell to a target cell may be performed successfully. Further, by decoding the PBCH of a neighbor cell, the UE can increase the likelihood of handover success in weak coverage areas and/or coverage areas with synchronous SSSs. Additionally, by maintaining the state of a handover candidate list for an amount of time after a UE transmits a measurement report identifying the neighbor cell as a handover candidate, the UE may increase a likelihood that handover from a serving cell to a target cell may be performed successfully. Increasing a likelihood of successfully handing over from a serving cell to a target cell may, for example, reduce a rate at which packet switched calls (e.g., VoLTE calls) are dropped and may improve VoLTE call quality.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in figures, those operations may have corresponding counterpart means-plus-function components.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
   initiating a search for a secondary synchronization signal (SSS) for a first cell of one or more handover candidate cells;
   attempting to decode a primary broadcast channel (PBCH) for the first cell if the SSS for the first cell is not detected a threshold number of times, wherein attempting to decode the PBCH for the first cell is performed while an amount of time remaining in a time to trigger period is greater than a threshold amount of time;
   upon determining that the amount of time remaining in the time to trigger period is less than the threshold amount of time and that the PBCH has not been successfully decoded, removing the first cell from the group of handover candidate cells; and
   reporting the first cell as a handover candidate in a measurement report if the SSS for the first cell is detected the threshold number of times and if the PBCH is successfully decoded.

2. The method of claim 1, wherein the one or more handover candidate cells comprise one or more cells having a detected signal quality above a signal quality threshold level.

3. The method of claim 2, wherein the first cell comprises a cell in the one or more handover candidate cells having the highest detected signal quality.

4. The method of claim 2, wherein the signal quality comprises at least one of a reference signal received quality (RSRQ) measurement or a reference signal received power (RSRP) measurement.

5. The method of claim 1, wherein the attempting to decode the PBCH for the first cell is performed upon further determining that a signal quality of the first cell is less than a signal quality threshold level.

6. The method of claim 1, further comprising:
   upon transferring to the first cell after transmitting the measurement report based on successfully decoding the PBCH of the first cell, decoding a system information block (SIB) without performing an additional decoding of the PBCH of the first cell.

7. The method of claim 1, wherein each cell of the one or more handover candidate cells is associated with an expiration time.

8. The method of claim 7, wherein the expiration time indicates a time period after transmission of a measurement report during which cells cannot be removed as a handover candidate cell.

9. The method of claim 1, further comprising:
   upon failing to detect the SSS for the first cell for the threshold number of times after the measurement report is transmitted, removing the first cell from the group of handover candidate cells if a signal quality measurement associated with the first cell is less than a threshold signal quality measurement.

10. A method for wireless communications, comprising:
    reporting a first cell, of one or more handover candidate cells, as a handover candidate in a measurement report; and
    removing the first cell as a handover candidate cell, if a secondary synchronization signal (SSS) for the first cell is not detected a threshold number of times and at least one of a reference signal received quality (RSRQ) measurement or a reference signal received power (RSRP) measurement of the first cell does not satisfy a signal quality threshold.

11. The method of claim 10, wherein removing the first cell as a handover candidate cell is further based on expiration of a period of time since reporting the first cell in the measurement report.

12. An apparatus for wireless communications, comprising:
    a processor configured to:
       initiate a search for a secondary synchronization signal (SSS) for a first cell of one or more handover candidate cells,
       attempt to decode a primary broadcast channel (PBCH) for the first cell if the SSS for the first cell is not detected a threshold number of times, wherein attempting to decode the PBCH for the first cell is performed while an amount of time remaining in a time to trigger period is greater than a threshold amount of time;
       upon determining that the amount of time remaining in the time to trigger period is less than the threshold amount of time and that the PBCH has not been successfully decoded, remove the first cell from the group of handover candidate cells; and
       report the first cell as a handover candidate in a measurement report if the SSS for the first cell is detected the threshold number of times and if the PBCH is successfully decoded; and
    a memory.

13. The apparatus of claim 12, wherein the one or more handover candidate cells comprise one or more cells having a detected signal quality above a signal quality threshold level.

14. The apparatus of claim 13, wherein the first cell comprises a cell in the one or more handover candidate cells having the highest detected signal quality.

15. The apparatus of claim 13, wherein the signal quality comprises at least one of a reference signal received quality (RSRQ) measurement or a reference signal received power (RSRP) measurement.

16. The apparatus of claim 12, wherein attempting to decode the PBCH for the first cell is performed upon further determining that a signal quality of the first cell is less than a signal quality threshold level.

17. The apparatus of claim 12, wherein the processor is further configured to:
    upon transferring to the first cell after transmitting the measurement report based on successfully decoding the PBCH of the first cell, decode a system information block (SIB) without performing an additional decoding of the PBCH of the first cell.

18. The apparatus of claim 12, wherein each cell of the one or more handover candidate cells is associated with an expiration time.

19. The apparatus of claim 18, wherein the expiration time indicates a time period after transmission of a measurement report during which cells cannot be removed as a handover candidate cell.

20. The apparatus of claim 12, wherein the processor is further configured to:
    upon failing to detect the SSS for the first cell for the threshold number of times after the measurement report is transmitted, removing the first cell from the group of handover candidate cells if a signal quality measurement associated with the first cell is less than a threshold signal quality measurement.

21. An apparatus for wireless communications, comprising:
    a processor configured to:

report a first cell, of one or more handover candidate cells, as a handover candidate in a measurement report, and remove the first cell as a handover candidate cell, if a secondary synchronization signal (SSS) for the first cell is not detected a threshold number of times and at least one of a reference signal received quality (RSRQ) measurement or a reference signal received power (RSRP) measurement of the first cell does not satisfy a signal quality threshold; and a memory.

22. The apparatus of claim 21, wherein removing the first cell as a handover candidate cell is further based on expiration of a period of time since reporting the first cell in the measurement report.

* * * * *